US005556558A

United States Patent [19]

Ross et al.

[11] Patent Number: 5,556,558

[45] Date of Patent: Sep. 17, 1996

[54] PLASMA JET CONVERGING SYSTEM

[75] Inventors: Douglas A. Ross, Richmond; Alan Burgess, North Vancouver, both of Canada

[73] Assignee: The University of British Columbia, Vancouver, Canada

[21] Appl. No.: 352,709

[22] Filed: Dec. 5, 1994

[51] Int. Cl.[6] .......... B23K 10/00

[52] U.S. Cl. .......... 219/121.5; 219/121.51; 219/75.16; 219/121.47; 427/446

[58] Field of Search .......... 219/121.52, 121.5, 219/121.47, 121.59, 121.48, 76.16, 76.15, 75, 121.51; 427/446, 449

[56] References Cited

U.S. PATENT DOCUMENTS

| | | | |
|---|---|---|---|
| 4,136,273 | 1/1979 | Eujita et al. | 219/121.52 |
| 4,818,837 | 4/1989 | Pfender | 219/121.51 |
| 4,982,067 | 1/1991 | Marantz et al. | 219/121.47 |
| 5,008,511 | 4/1991 | Ross | 219/121.47 |
| 5,144,110 | 9/1992 | Marantz et al. | 219/76.16 |
| 5,235,160 | 8/1993 | Suzuki et al. | 219/121.52 |
| 5,298,835 | 3/1994 | Mueblberger et al. | 219/121.47 |
| 5,420,391 | 5/1995 | Delcea | 219/121.47 |

FOREIGN PATENT DOCUMENTS

| | | |
|---|---|---|
| 230300 | 4/1988 | Japan . |

*Primary Examiner*—Mark H. Paschall
*Attorney, Agent, or Firm*—C. A. Rowley

[57] ABSTRACT

Plasma jets are converged in encircling relationship about a common axis along which a reactant stream is introduced. The reactant stream is confined by the converging and confining plasma jets the shape and direction of flow of which are predefined by converging plasma gas passages concentric with the longitudinal axis. Each plasma gas passage has a minor axis substantially radial to the common axis and a major axis substantially perpendicular to the minor axis at their point of intersection. A body member through which the discrete passages formed is provided with a plurality of cooling passages, some of which extend into and cool fins formed between adjacent plasma gas passages and thereby cool the reactant stream.

20 Claims, 4 Drawing Sheets

PLASMA JET CONVERGING SYSTEM

FIELD OF THE INVENTION

The present invention relates to plasma spraying apparatus, more particularly, the present invention relates to a converging system for directing plasma jets in symmetrical converging relationship about a common axis.

BACKGROUND OF THE PRESENT INVENTION

The concept of converging plasma jets about a common axis, for example an axis along which reactant is injected into the plasma jets was probably first disclosed in the Japanese laid open application 61-1986-230300 having an application date of Apr. 5, 1985 by Fukanuma, which discloses a plurality of discrete plasma forming guns arranged in encircling relationship about the reactant injection tube so that the plasma jets issuing from these torches are directed by plasma passages arranged at circumferentially symmetrically space locations about the injection tube to converge onto the reactant stream issuing from the reactant injection tube. This system was, it is believed, found to be ineffective and was eventually abandoned.

The first commercially acceptable system, that is commercially effectively being operated is disclosed in U.S. Pat. No. 5,008,511 issued Apr. 16, 1991, to Ross. In this system, a plurality of plasma guns are arranged in symmetrical relationship about a common axis along which reactant is injected through a reactant pipe. The pipe passes through a common anode and is uniformly contacted by the plasma jets in an area of convergence of the jets extending along a plasma jet passage. This system has been found to work effectively and over reasonably long periods of time without significant detrimental effects.

Marantiz et al. in U.S. Pat. No. 4,982,067 issued Jan. 1, 1991 and U.s. Pat. No. 5,144,110 issued Sep. 1, 1992, describe a converging system for converging a plurality of arc currents into a single plasma column and converging them symmetrically onto a stream of reactant issuing along an axis about which the torches and passages are symmetrically arranged.

The recent U.S. Pat. No. 5,298,835 to Muehlberger et al. issued Mar. 29, 1994 describes a converging plasma jet system wherein the plasma outputs of the torches each is directed axially from the respective torches through a passage. These passages converge to direct plasma gas jets issuing therefrom to converge onto a reactant stream issuing from a central reactant tube about which the passages and torches are symmetrically arranged.

One of the inherent problems in all of these systems is to ensure that the reactant stream is uniformly contacted and distributed in the plasma stream formed from the converging discrete plasma jets. Another common problem in some of the systems is spitting (periodic burst of released reactant that built up in the system) which occurs when some of the reactant solidifies within the body of the converging system or block and is periodically dispersed into the plasma stream so that the flow of reactant is non-uniform.

BRIEF DESCRIPTION OF THE PRESENT INVENTION

It is an object of the present invention to provide an improved multi-jet plasma system that ensures containment of the stream of reactant material.

It is a further object of the present invention to reduce spitting caused by build-up and release of reactive material within the system.

Broadly, the present invention relates to a plasma jet directing system for directing a plurality of plasma jets into converging relationship to entrap a reactant stream comprising a body portion having a central reactant injection passage means extending substantially concentric with a central axis, at least two plasma gas passages, said gas passages converging in a direction flow of plasma gases through said converging gas passages toward said central reactant passage means and terminating in an outlet end, said gas passages being symmetrically positioned relative to said central axis, each of said gas passages having a longitudinal axis extending axially of its said gas passage, a minor axis substantially radial to said central axis and a major axis substantially perpendicular to said minor axis at their point of intersection, each said minor axis being shorter than its major axis so that each said gas passage has a cross sectional shape that is symmetrically elongated on opposite sides of its minor axis, each said gas passage having a plasma jet shaping wall defining a major side of its passage at its gas passages outlet end, said jet shaping wall being spaced from an imaginary plane extending substantially perpendicular to said minor axis and positioned between said jet shaping wall and said central axis by a distance at an intersection of said minor axis with said jet shaping wall equal to or greater than spacing between said plane and points of said jet shaping wall on opposite sides of said minor axis.

Preferably said central reactant injection passage means will comprise a single injection passage concentric with said central axis.

Preferably said jet shaping wall of each said gas passage will comprise an inner wall of its said gas passage adjacent to said central axis.

Preferably, said body portion will include tapered fins positioned one between adjacent sides of adjacent gas passages, each said tapering fin having its wider end adjacent upstream ends of said gas passages relative to the direction of flow of plasma gas, coolant passages through each said fin, said coolant passages extending between said upstream ends of said fins and blind passages extending through said fins toward said central axis ànd spaced downstream of said upstream ends of said fins.

Preferably, intersection of said minor axis with said inner wall of each said passage will be spaced farther from said plane than other points on said inner wall.

Preferably, a projected length L of said wall measured along said plane projects outside of said central reactant injection passage means by a distance of at least ½ the minimum diameter D of said reactant passage means.

Preferably the length $l_{maj}$ of said major axis will be equal to or greater than 1.5× the length $l_{min.}$ of said minor axis of said gas passage at said outlet end.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
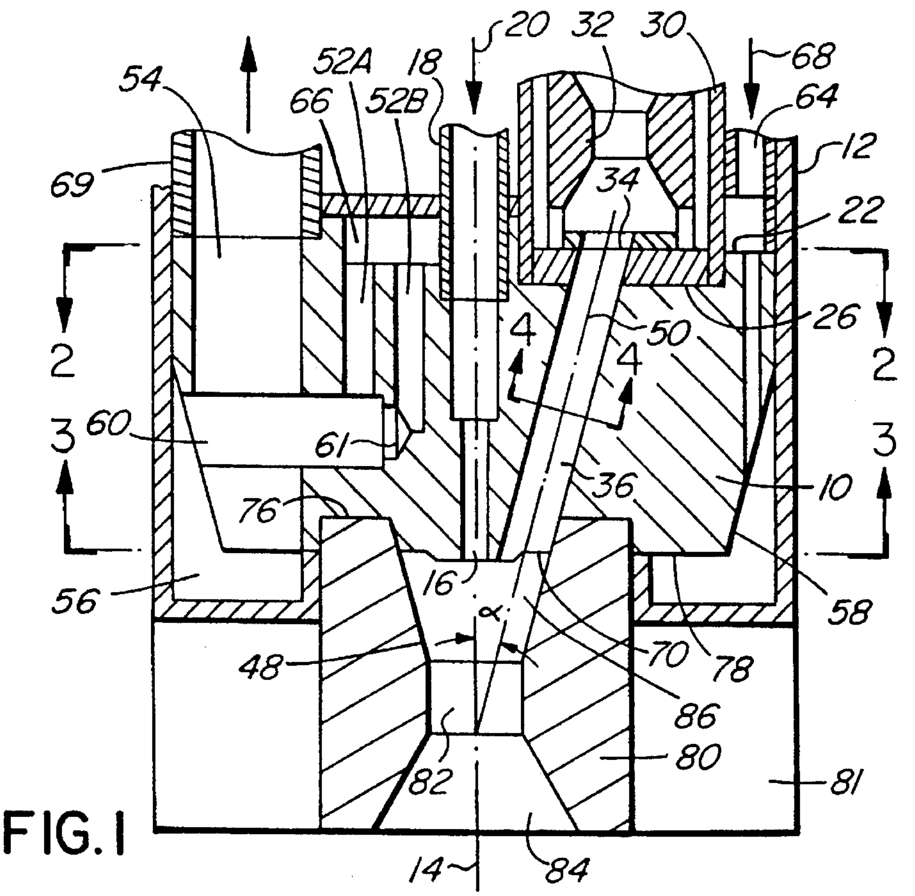
FIG. 1 is a cross-sectional view of a plasma jet converging system, constructed in accordance with the present invention.

As shown in FIG. 1, the plasma jet converging and reactant cooling system of the present invention is formed by a main body 10 contained within a housing 12 only a portion of which shown.

The body portion 10 is formed with various passages for cooling fluid or plasma gases and cavities for receiving cooperating elements of the system that are positioned substantially symmetrically relative to a central axis 14 of the plasma system composed as will be described below of at least one reactant injection passage contained between a plurality of converging plasma gas passages symmetrically arranged about the central axis 14.

A reactant injection passage 16 is, in the arrangement illustrated in FIGS. 1 to 6, concentric with the axis 14 and is fed via the pipe 18, as indicated by the arrow 20 in FIG. 1, with reactant material such as powders or the like generally carried in a gas stream.

Figure 2:
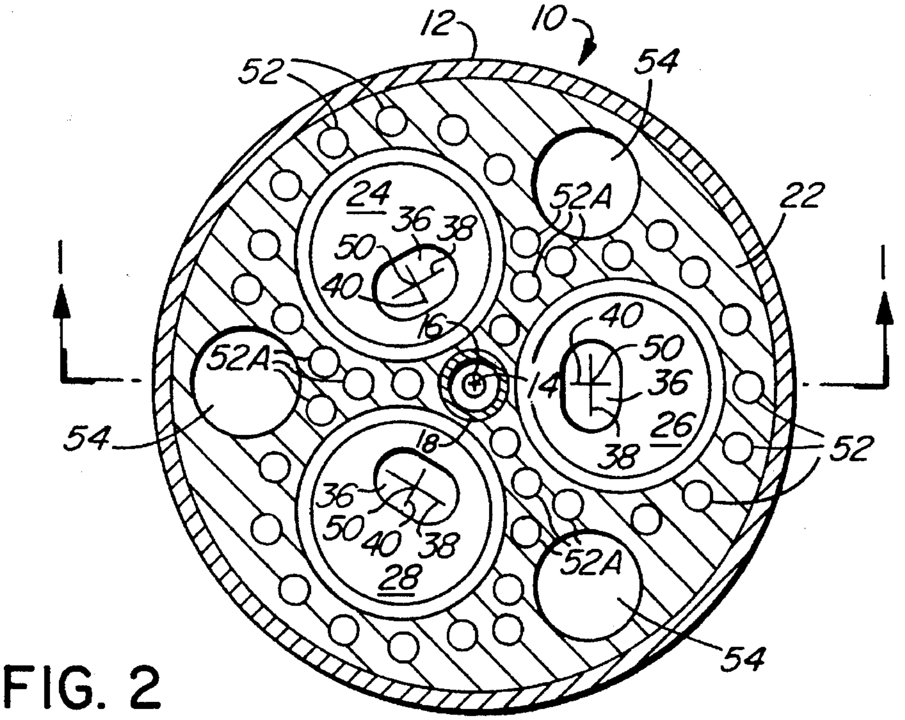
FIG. 2 is a section along the line 2—2 in FIG. 1.
Figure 3:
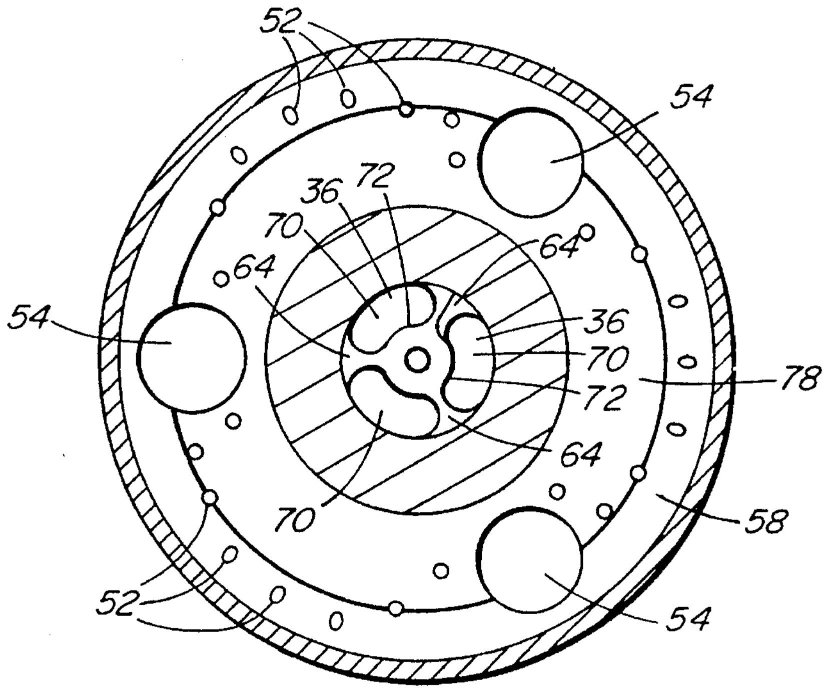
FIG. 3 is a section along the line 3—3 in FIG. 1.

The upper surface 22 of the block or body member 10, in the version illustrated in FIGS. 2 and 3, is provided with torch receiving cavities, 24, 26 and 28, symmetrically arranged in uniformly spaced relationship around the axis 14, having their centres (since in the illustrated arrangement, the cavities 24, 26 and 28 are shown as circular) spaced at 120° intervals relative to each other around the axis 14

While the cavities 24, 26 and 28 have been shown as circular, there may be other shapes and sizes as required to accommodate the specific plasma torch(s) with which the system is to be used, only one torch has been represented schematically at 30 in FIG. 1. The torch 30 shown in FIG. 1 is only partly shown and the parts shown as indicated are shown schematically and include the anode section 32 and the torch outlet 34.

Each of the cavities 24, 26 and 28 is provided with a directing and converging passage 36 into which the plasma gases leaving the torch 30 through the outlet 34 are directed i.e. each of the cavities 24, 26 and 28 will be essentially the same and will be provided as indicated in FIG. 2 with its passage 36, thus only one such cavity will be described. All three have been indicated by the same reference numeral.

Each of the passages 36 in the illustrated arrangement is elliptical in cross sectional shape in that it has a major axis 38 and a minor axis 40. The minor axis 40 of each passage 36 extends substantially radially of the axis 14 while the major axis 38 in the illustrated arrangement in FIG. 2 traverses the minor axis 40 at a right angle and in FIG. 2 is substantially a straight line, but may be slightly curved (as will be described hereinbelow with respect to FIGS. 3, 5 and 6).

Figure 4:
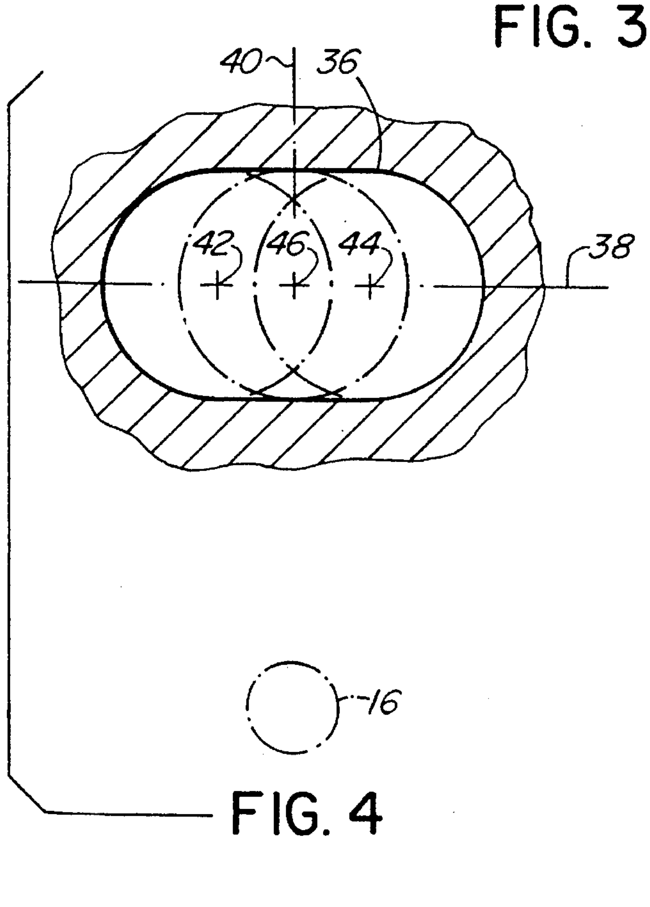
FIG. 4 is a section along the line 4—4 in FIG. 1 with the axial reactant passage illustrated for orientation.

In the arrangement illustrated in FIGS. 2 and 4, the passages 36 are each formed by three side by side milling operations wherein first a pair of outside holes are drilled and spaced centres 42 and 44 and then the central portion is milled out by milling on centre 46 to, after minor broaching and shaping to provide smooth walls, define the passage 36.

It will be noted that the longitudinal axes 50 (only one shown) of passages 36 converge toward the axis 14 from their upstream ends in their cavities 24, 26 or 28 respectively to their downstream ends adjacent to the outlet from the passage 16 in the position where they discharge plasma gases into a converging zone 48 (see FIG. 1 ).

This angle α between the longitudinal axis 50 of the passage 36, i.e. the axis 50 is the locus of the intersection of the major and minor axis 38 and 40 respectively along the axial length of the passage 36, and the axis 14 will generally be an acute angle in the range of approximately 10° to 20° preferably 15°.

In the described version shown in FIG. 4, the cross-sectional area of the passage 36 is substantially constant from its upstream end to its downstream end. However, this is not essential, for example the passages may taper i.e. reduce in cross section as the outlet end i.e. downstream end in the direction of plasma gas flow is approached or may narrow or change shape along the length of the passage however all such shapes will result in the gas stream issuing from the passage trapping the reactant stream and smoothly merging with the reactant stream issuing from the reactant injection passage 16.

Also, in the embodiment shown in FIG. 4, the periphery of the passage 36 remains substantially constant over its axial length. Variations of the shape of the passage may be made (some of which will be described hereinbelow) as will the essential characteristics of the shape of the plasma gas stream issuing from the passages which is determined primarily by the cross sectional shape and convergence angle α of the passage 36 and its positioning relative to the axial passage 14 which are important to the operation of the system as will be described below.

As shown in FIG. 2, there are a plurality of cooling water passages 52 which in the illustrated arrangement are substantially parallel to the axis 14. It will be apparent that these passages 52 are arranged over a substantial portion of the area of the top surface 22 of the body member 10 with the exception of the cavities 24, 26 and 28 and are also arranged symmetrically about the axis 14. Also provided through the body 10 are cooling fluid return passages 54 which are symmetrically positioned relative to the axis 14 and are positioned one intermediate to each adjacent pair of cavities 24, 26 or 28. These passages 54 are also substantially parallel to the axis 14.

Some of the holes or passages 52 extend completely through the block or body 10 and discharge into a chamber 56 within the housing 12 and surrounding the block 10. The block 10 in the illustrated arrangement is tapered, as indicated at 58, toward its downstream end 78.

As above indicated, some of the passages 52 extend all the way through, the body member 10, however, those passages located substantially radially relative to the axis 14 and positioned between the return passages 54 and the reaction material passage 16 cannot extend fully through the block 10. Similarly, any passage not received by the chamber 56 cannot pass directly through the body. Thus, the axial passages 52 spaced from the axis 14 by a radius less than the minimum radius of the chamber 56 about axis 14 must be provided with a separate return system that connects to the chamber 56 and/or the return passages 54.

As shown in FIG. 1, a substantially radial bore 60 is drilled into the block (there be one bore 60 for each of the return passages 54) extending into body 10 in a position to intercept the passages between the cavities 24, 26 and 28 adjacent to the passage 16 and between the passage 16 and the passages 54, i.e. see the passages 52A in FIGS. 1 and 2.

The bore 60 is reduced in diameter as indicated at 61 after it reaches a predetermined depth to maintain the integrity of the wall between the bore or passage 60 and the two adjacent passages 36.

The passages 52A and the bore 60 are formed in a tapering partition 62 between adjacent sides of passages 36 the downstream ends of which are indicated at 64 in FIG. 3. These partitions 62 each forms a fin 62 that tapers from its wide end upstream in the direction of plasma gas flow to its narrow downstream end 64 is adequately cooled by circulating cooling fluid via the passages 52A illustrated in FIGS. 2 and 3. Cooling of the fins 62 helps to maintain the material flowing in the reaction injection passage 16 sufficiently cool to prevent deposition and thereby prevent spitting.

In the system as described above, cooling fluid is introduced into a plenum chamber 66 that interconnects all of the upstream ends of the passages 52 including the passages 52A with a source of cooling fluid schematically indicated by the arrow 68. This cooling fluid passes through the various passages 52 including the passages 52A and into the chamber 56 or directly into the return passage 54 via bore which is connected via pipe 69 to a suitable reservoir or coolant chamber not shown, i.e. the output for each of the passages 54 may carried via its own pipe 69 or the pipes interconnect to direct cooling fluid to a container or the like from which after conditioning as required is recirculated and reintroduced as indicated at 68.

As above indicated, the cross sectional shape of the passages 36, particularly the shape of the outlet 70 which will normally define the shape of the plasma gas stream flowing from each passages 36 is important as is the position of these outlet ends 70 relative to the passage 16. As shown in FIG. 3 the outlets 70 are positioned to substantially totally surround the reactant passage 16 and thereby substantially confine the reactant stream issuing from the passage 16 and being injected into the converging plasma gas streams issuing from the passages 36 except in the area of the fins 62 which at their downstream end 64 are relatively narrow. At the downstream end 78 of the block 10, the converging plasma jets issuing from the passages 36 occupy at least 90% and preferably at least 95% of a circumference surrounding the axis 14 at the inner surfaces 72 of the passages 36.

Figure 5:
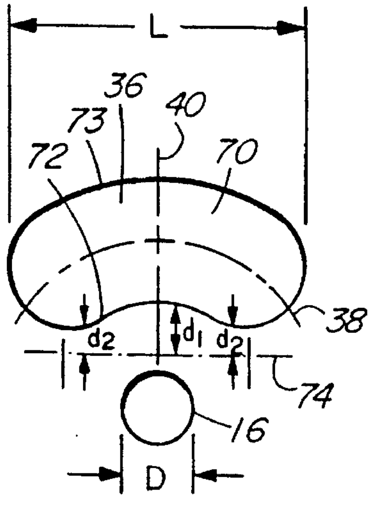
FIG. 5 is an enlarged view of the outlet end of one of the plasma gas passages.
Figure 6:
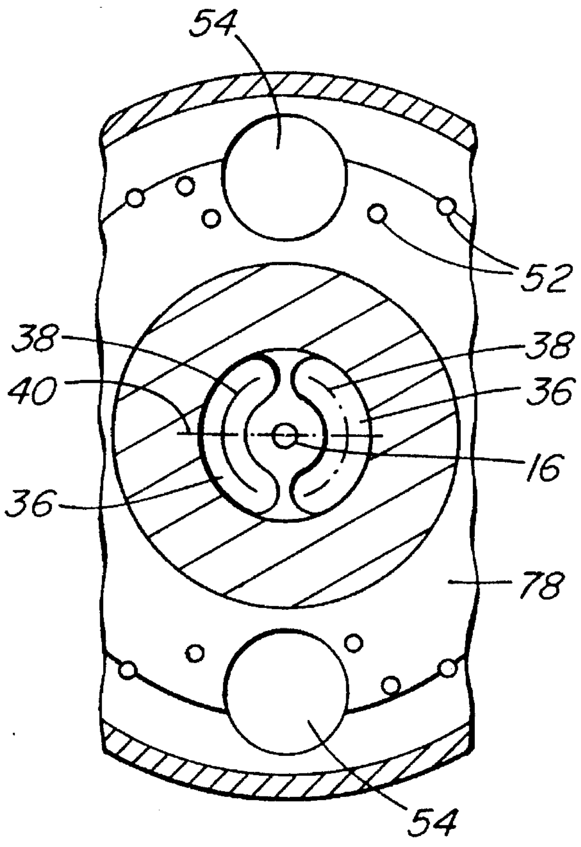
FIG. 6 is a view similar to FIG. 3 but showing a modified version of the present invention.

In the arrangement illustrated in FIGS. 3, 5 and 6 the outlet ends 70 of the passages 36 have been shown as curved elliptical shapes i.e. a curved elliptical shape wrapped around the axis 14 i.e. the major axis 40 is slightly curve preferably on a radius centred on the minor axis 38 so that the issuing jets of plasma gases are better able to entrap the jet or stream of reactants issuing from the passage 16.

It will be apparent that in all embodiments, the stream of plasma gases issuing from the passages 36 uniformly converge to completely encircle the stream of reactant being injected via the passage 16.

The outlet end 70 preferably will have the width measured substantially perpendicular to the minor axis 40 that is at least twice the diameter D of the passage 16 (see FIG. 5) and the major axis 38 as above indicated may be curved preferably on an arc centred on the minor axis 40, see FIG. 5. This means that the inner wall 72 at the outlet end 70 from each of the passage 36 at its intersection with the minor axis 40 will be spaced a maximum distance $d_1$ from an imaginary plane 74 substantially perpendicular to the minor axis 40 and position between the passages 16 and 36 and that all of other points on the inner wall 72 will be at a distance e.g. distance $d_2$ equal to or less than the distance $d_1$ from the plane 74 and other positions along the length 72, i.e. $d_1 \geqq d_2$.

In the above description the inner wall is the plasma jet shaping wall of the passage. In some embodiments the outer wall 73 may be the plasma jet shaping wall and in that case the above rule for the inner wall 72 i.e. $d_1 \geqq d_2$ will apply to the outer wall in other words the above rule i.e. $d_1 \geqq d_2$ will apply to which ever wall of the passage 36 is the plasma jet shaping wall that defines the shape of the converging plasma jet to ensure it confines the reactant stream.

This manner of shaping the cross sectional shape of the passages 36 so that each is elongated in the direction perpendicular to the minor axis 40 better ensures trapping of the reactive material in the stream issuing from the passage 36 within the plasma stream. This shape coupled with the size or lateral dimension L relative to the minor axis 38 of the passage 36, i.e. 2D is$\leqq$L where D is the diameter of the outlet 16 and L/2 is the distance that each passage 36 extend on each side of the minor axis 38 measured parallel to the plane 74.

The relationship of the length $l_{min}$ of the minor axis 40 to the length $l_{maj}$ of the major axis 38 is also important and has found to be best when the length of the major axis 38 is at least 1.5 time the length of the minor axis 40 i.e. $l_{maj} \geqq 1.5 l_{min}$.

To better ensure the operation of the plasma system, it is preferred to provide a cavity 76 in the bottom face i.e downstream end 78 of the body 10 and to mount in the cavity 76 a nozzle structure 80 that has a passage that preferably converges initially as indicated at 86 at essentially the same angle of convergence as the angle $\alpha$ and then is reshaped to be substantially cylindrical as indicated at 82 and eventually flare as indicated at 84. A suitable cooling system schematically indicated at 81 will normally be provided in encircling relationship with the nozzle 80 to prevent it from over heating.

The above description has dealt with a system to accommodate three different torches structures, in FIG. 6 wherein only two passages 36 are shown, one positioned on one side of the passage 16 and the other on the other side. It is important that the outlet ends 70 of the two passages 36 substantially completely surround the passage 16 to converge and ensure that the materials issuing from the passage 16 are contained within the plasma jet formed from the two passages 36.

It will be apparent with the systems as above described there is intended to be a torch cavity and thus a separate torch for each of the passages, if desired a single torch may be used as the plasma source for a plurality of the plasma gas passages 36.

While arrangements to accommodate two or three torches have been illustrated, it will be apparent that a different number of torches may be used it being important to ensure that converging streams or jets of plasma gases be formed in a manner to substantially completely the surround the reactant containing stream and that adequate cooling be applied to the reactant stream and the converging passage structure.

Figure 7:
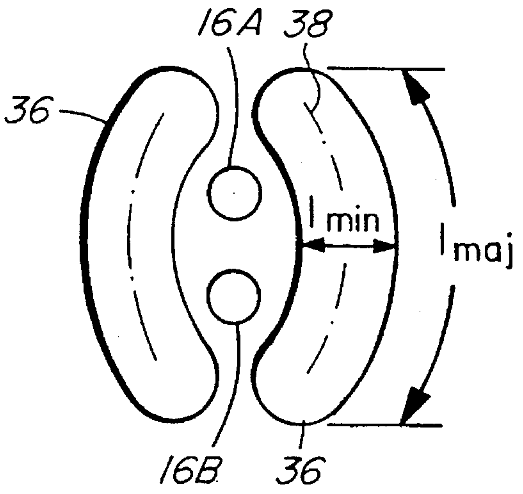
FIG. 7 is a partial view similar to FIGS. 3 and 6 but illustrating a system wherein a plurality of reactant injection passages discharge within the converging zone of the plasma streams.

Similarly in the above described embodiments a single reactant passage 16 has bee shown, if desired a plurality of such passages may be arranged preferably symmetrically relative to the central axis 14 to introduce reactant from more than one source. FIG. 7 shows a view similar to FIGS.

6 and 3 but with a pair of reactant injection passages 16A and 16B provided in place of the single passage 16 described above. The passages 16A and 16B are equally spaced on opposite sides of the centre 14 and are contained between the two passages 36. In this embodiment the amount the passages 36 extend laterally of the passages 16A and 16B is related to the diameter of each of the passages 16.

Figure 8:
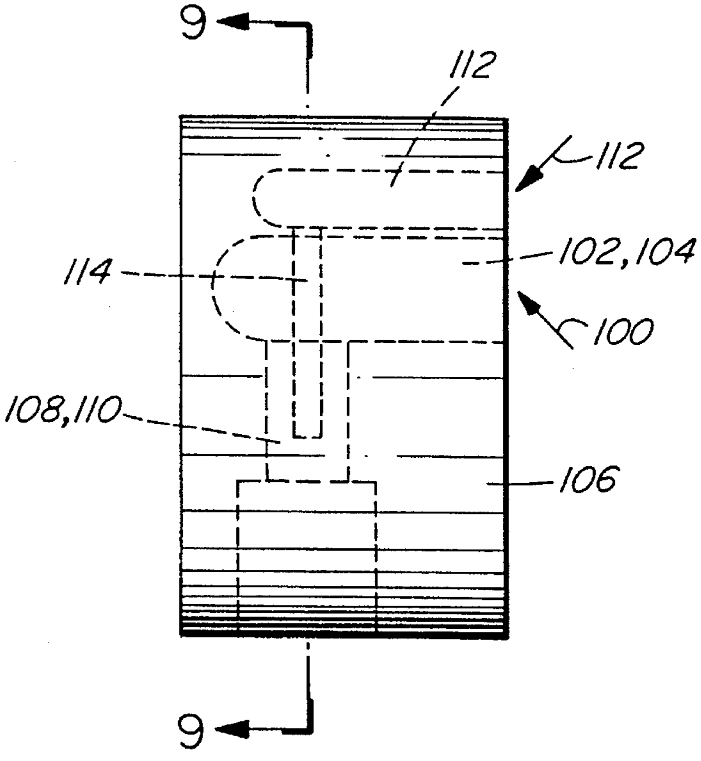
FIG. 8 is a side elevation of a different form of plasma jet converging system incorporating the present invention.
Figure 9:
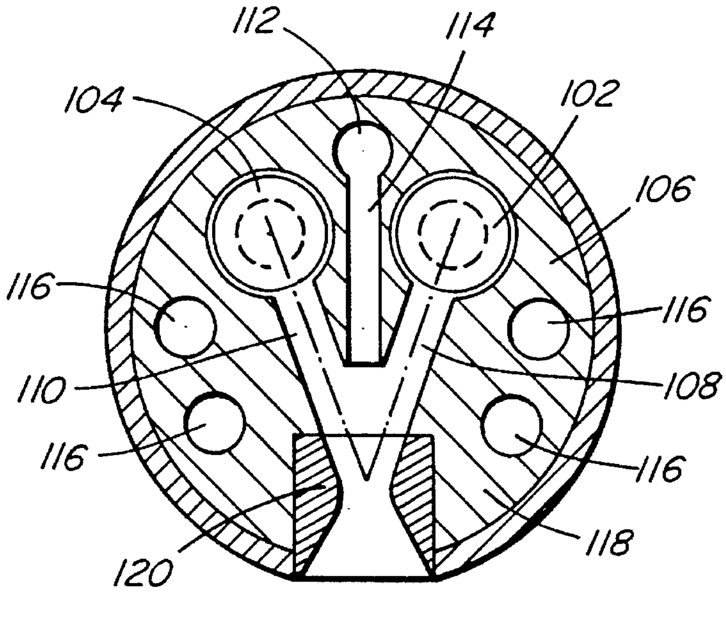
FIG. 9 is a section along the line 9—9 of FIG. 8.

In the embodiment shown in FIGS. 8 and 9 the plasma gas is introduced as indicated by the arrow 100 from any suitable source (one or more torches) and is directed along the parallel plasma conducting passages 102 and 104 formed in a body member 106. Each of the passages 102 and 104 connects with its respective plasma gas passage 108 and 110 which extend at an angle from their passages 102 and 104. The passages 108 and 110 are equivalent to a pair of converging passages 36 described above and thus require no further description.

The reactant is introduced as indicated by the arrow 112 into a passage 114 which connects with a reactant injection passage equivalent to the passage 16 (or 16A and 16B etc. described above and appropriately positioned relative to the passages 108 and 110.

The body member in the illustrated arrangement has a plurality of cooling fluid passages 116 and is retained in a retaining ring 118. If desired a suitable nozzle 120 may be mounted to receive the flows from the passages 108, 110 and 114 i.e. in the same manner as the nozzle 80 described above.

It is not essential that the reactant injection passages 16, 16A, 16B always have a circular cross section as illustrated in the drawings, they may have any suitable shape eg. elliptical. It will be understood that when a cross sectional shape other than circular or when a plurality of reactant passages are used the diameter D of the passage is not defined in these conditions the projected length L of the shaping plasma passage wall will project on the outside of the reactant injection passages by a distance equal to at least the smallest radius (cross sectional dimension of the adjacent reactant passage of adjacent portion thereof if the passage is elliptical.

Having described the invention, modifications will be evident to those skilled in the art without departing from the scope of the invention as defined in the appended claims.

We claim:

1. A plasma jet directing system for directing a plurality of plasma jets into converging relationship to entrap a reactant stream comprising a body portion having a central reactant injection passage means extending substantially concentric with a central axis, at least two plasma gas passages, each said plasma gas passage having an inlet end and an outlet end, said gas passages converging toward each other and toward said central reactant passage means in a direction flow of plasma gases through said converging gas passages from said inlet end toward said outlet end, said gas passages being symmetrically positioned relative to said central axis, each of said gas passages having a longitudinal axis extending axially of its said gas passage and converging toward said central passage in said direction of flow at an acute angle to said central axis a minor axis substantially radial to said central axis and a major axis substantially perpendicular to said minor axis at their point of intersection, each said minor axis being shorter than its major axis so that each said gas passage has a cross sectional shape that is symmetrically elongated on opposite sides of its minor axis, each said gas passage having a plasma jet shaping wall defining a major side of its passage at its gas passages outlet end, said jet shaping wall being spaced from an imaginary plane positioned adjacent said outlet end of its gas passage and extending substantially perpendicular to said minor axis and positioned between said jet shaping wall and said central axis, said imaginary plane being spaced from said jet shaping wall at an intersection of said minor axis with said jet shaping wall by a distance equal to or greater than spacing between said imaginary plane and points of said jet shaping wall on opposite sides of said minor axis.

2. A plasma jet directing system as defined in claim 1 wherein said central reactant injection passage means comprises a single injection passage concentric with said central axis.

3. A plasma jet directing system as defined in claim 1 wherein said jet shaping wall of each said gas passage comprises an inner wall of its said gas passage adjacent to said central axis.

4. A plasma jet directing system as defined in claim 1 wherein said body portion includes tapered fins positioned one between adjacent sides of adjacent gas passages, each said tapered fin having its wider end adjacent upstream ends of said gas passages relative to the direction of flow of plasma gas therethrough, coolant passages through each said fin, said coolant passages extending between said upstream ends of said fins and a blind passage extending through said fin toward said central axis and spaced downstream of said upstream ends of said fins.

5. A plasma jet directing system as defined in claim 2 wherein said body portion includes tapered fins positioned one between adjacent sides of adjacent gas passages, each said tapered fin having its wider end adjacent upstream ends of said gas passages relative to the direction of flow of plasma gas therethrough, coolant passages through each said fin, said coolant passages extending between said upstream ends of said fins and a blind passage extending through said fin toward said central axis and spaced downstream of said upstream ends of said fins.

6. A plasma jet directing system as defined in claim 3 wherein said body portion includes tapered fins positioned one between adjacent sides of adjacent gas passages, each said tapered fin having its wider end adjacent upstream ends of said gas passages relative to the direction of flow of plasma gas therethrough, coolant passages through each said fin, said coolant passages extending between said upstream ends of said fins and a blind passage extending through said fin toward said central axis and spaced downstream of said upstream ends of said fins.

7. A plasma jet directing system as defined in claim 1 wherein said intersection of said minor axis with said shaping wall of each said passage is spaced farther from said plane than other points on said inner wall.

8. A plasma jet directing system as defined in claim 2 wherein said intersection of said minor axis with said shaping wall of each said passage is spaced farther from said plane than other points on said inner wall.

9. A plasma jet directing system as defined in claim 4 wherein said intersection of said minor axis with said shaping wall of each said passage is spaced farther from said plane than other points on said inner wall.

10. A plasma jet directing system as defined in claim 1 wherein a projected length L of said shaping wall measured along said plane projects outside of said central reactant injection passage means by a distance of at least ½ the minimum diameter D of an adjacent portion of said passage means.

11. A plasma jet directing system as defined in claim 2 wherein a projected length L of said shaping wall measured along said plane projects outside of said central reactant injection passage means by a distance of at least ½ the minimum diameter D of an said passage means.

12. A plasma jet directing system as defined in claim 3 wherein a projected length L of said shaping wall measured along said plane projects outside of said central reactant injection passage means by a distance of at least ½ the minimum diameter D of an said passage means.

13. A plasma jet directing system as defined in claim 4 wherein a projected length L of said shaping wall measured along said plane projects outside of said central reactant injection passage means by a distance of at least ½ the minimum diameter D of an said passage means.

14. A plasma jet directing system as defined in claim 1 wherein length $l_{maj}$ of said major axis will be equal to or greater than 1.5× the length $l_{min.}$ of said minor axis of said gas passage at said outlet end.

15. A plasma jet directing system as defined in claim 2 wherein length $l_{maj}$ of said major axis will be equal to or greater than 1.5× the length $l_{min.}$ of said minor axis of said gas passage at said outlet end.

16. A plasma jet directing system as defined in claim 3 wherein length $l_{maj}$ of said major axis will be equal to or greater than 1.5× the length $l_{min.}$ of said minor axis of said gas passage at said outlet end.

17. A plasma jet directing system as defined in claim 4 wherein length $l_{maj}$ of said major axis will be equal to or greater than 1.5× the length $l_{min.}$ of said minor axis of said gas passage at said outlet end.

18. A plasma jet directing system as defined in claim 5 wherein length $l_{maj}$ of said major axis will be equal to or greater than 1.5× the length $l_{min.}$ of said minor axis of said gas passage at said outlet end.

19. A plasma jet directing system as defined in claim 6 wherein length $l_{maj}$ of said major axis will be equal to or greater than 1.5× the length $l_{min.}$ of said minor axis of said gas passage at said outlet end.

20. A plasma jet directing system as defined in claim 7 wherein length $l_{maj}$ of said major axis will be equal to or greater than 1.5× the length $l_{min.}$ of said minor axis of said gas passage at said outlet end.

* * * * *